US010562500B2

(12) United States Patent
Trebouet

(10) Patent No.: US 10,562,500 B2
(45) Date of Patent: Feb. 18, 2020

(54) WIPER WITH HYDRAULIC CONNECTOR

(71) Applicant: Marcel Trebouet, Chavenay (FR)

(72) Inventor: Marcel Trebouet, Chavenay (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 629 days.

(21) Appl. No.: 14/406,631

(22) PCT Filed: Jun. 14, 2013

(86) PCT No.: PCT/FR2013/051398
§ 371 (c)(1),
(2) Date: Dec. 9, 2014

(87) PCT Pub. No.: WO2013/186503
PCT Pub. Date: Dec. 19, 2013

(65) Prior Publication Data
US 2015/0183405 A1     Jul. 2, 2015

(30) Foreign Application Priority Data

Jun. 14, 2012 (FR) ..................................... 12 55569

(51) Int. Cl.
*B60S 1/52* (2006.01)
*B60S 1/38* (2006.01)
*B60S 1/40* (2006.01)

(52) U.S. Cl.
CPC ............ *B60S 1/524* (2013.01); *B60S 1/3862* (2013.01); *B60S 1/3868* (2013.01);
(Continued)

(58) Field of Classification Search
CPC .............................. B60S 1/3862; B60S 1/524
(Continued)

(56) References Cited

U.S. PATENT DOCUMENTS 6,675,432 B1 * 1/2004 De Block ............. B60S 1/3863
15/250.32
2009/0172907 A1   7/2009 Egner-Walter et al.
(Continued)

FOREIGN PATENT DOCUMENTS

CN       101563261 A     10/2009
DE    10 2007 062304 A1    6/2009
(Continued)

OTHER PUBLICATIONS

DE102010052314A1 (machine translation), 2012.*
(Continued)

*Primary Examiner* — Andrew A Horton
(74) *Attorney, Agent, or Firm* — Osha Liang LLP

(57) ABSTRACT

The invention concerns a motor vehicle wiper 3 including at least one wiper fastened to at least one device 14 for stiffening the wiper and to which is fixed at least a mechanical connector 15 adapted to connect the wiper 3 to an arm, the wiper 3 including at least one element 8 in which there is provided at least one conduit 9 adapted to channel a liquid, and a hydraulic connector 13 in communication at least with the conduit 9 and immediately adjacent the mechanical connector 15, characterized in that the hydraulic connector 13 includes fastening means 16 engaged at least with the stiffening device 14.

11 Claims, 3 Drawing Sheets

Figure 1:
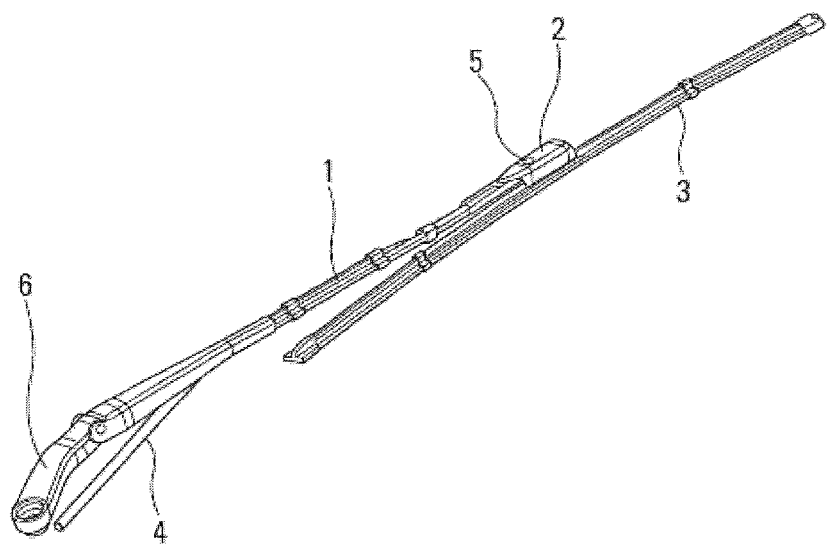

(52) U.S. Cl.
CPC ........... *B60S 1/3881* (2013.01); *B60S 1/4038* (2013.01); *B60S 1/381* (2013.01); *B60S 1/4083* (2013.01); *B60S 2001/4051* (2013.01)

(58) Field of Classification Search
USPC ...................................... 15/250.04
See application file for complete search history.

(56) References Cited

U.S. PATENT DOCUMENTS

| | | | | |
|---|---|---|---|---|
| 2011/0107541 A1* | 5/2011 | Caillot | ................. | B60S 1/3862 |
| | | | | 15/250.04 |
| 2011/0185531 A1 | 8/2011 | Egner-Walter et al. | | |
| 2012/0030894 A1* | 2/2012 | Garrastacho | ............ | B60S 1/381 |
| | | | | 15/250.201 |
| 2012/0090123 A1* | 4/2012 | Caillot | ................... | B60S 1/381 |
| | | | | 15/250.04 |

FOREIGN PATENT DOCUMENTS

| | | | | |
|---|---|---|---|---|
| DE | 102010052314 S1 * | 5/2012 | ............ | B60S 1/3805 |
| EP | 1 918 167 A1 | 5/2008 | | |
| EP | 2368776 A1 * | 9/2011 | ............ | B60S 1/3862 |
| WO | WO 2007142390 A1 * | 12/2007 | ................ | B60S 1/38 |

OTHER PUBLICATIONS

EP2368776A1 (machine translation), 2011.*
International Search Report for corresponding International Application No. PCT/FR2013/051398, dated Aug. 7, 2013 (3 pages).
First Office Action issued in corresponding Chinese Application No. 201380035837.3, dated Feb. 26, 2016 (14 pages).

* cited by examiner

WIPER WITH HYDRAULIC CONNECTOR

The field of the present invention is that of vehicle equipment, and more particularly that of motor vehicle windshield wiping equipment. The present invention is directed to a wiper adapted to wipe a motor vehicle windshield or rear window.

Motor vehicles are routinely equipped with windshield-wiper systems for washing and wiping the windshield and preventing disturbance to the driver's view of their environment. These windshield wipers are conventionally driven by a wiper arm effecting an angular to-and-fro movement and include elongate blades carrying wiper blades made from a resilient material. These wiper blades rub against the windshield and evacuate the water, removing it from the driver's field of view. The blades are produced in the form either, in a conventional version, of articulated swing-arms that hold the wiper blade at a number of separate locations or, in a more recent so-called "flat blade" version, a semi-rigid assembly that holds the wiper blade over the whole of its length. In the second solution, the blade is attached to the blade-holder by an assembly comprising a mechanical connector and an adapter. The mechanical connector is a part that is crimped directly to the flat blade while the adapter is an intermediate part that enables fixing of the connector to the windshield wiper arm. These two parts are connected to each other by a transverse pin that allows their relative rotation in a plane perpendicular to the windshield passing through the arm.

This windshield wiper system can also be equipped with a device for feeding a windshield washing liquid that is conveyed from a reservoir located on the vehicle and is sprayed in the direction of the windshield by nozzles situated either around the windshield or on the wiper itself. It is to be understood here that there are at least two ways to spray this liquid, these resulting in different technical solutions implemented on the wipers concerned. This represents a first drawback, because these technical solutions limit standardization in the manufacture of these wipers. By way of one illustrative example of this drawback, there are mechanical connectors of identical structure the only difference between which is the presence of the fluid circulation conduit. Such a difference nevertheless imposes the use of two separate moulds and generates a heavy logistical load because it is necessary to manage two part numbers.

Another drawback lies in the fact that wipers equipped with spraying nozzles and used in a wiping system in which the two arms carrying the wipers move in the same direction are not compatible with a butterfly type wiping system in which the two arms move in opposite directions.

The aim of the present invention is therefore to eliminate the drawbacks referred to above primarily by providing a hydraulic connector that can be fitted to the wiper easily and is independent of the mechanical connector, such a hydraulic connector thus making it possible to distribute the washing liquid to one or more spray manifolds installed on the wiper.

The invention therefore consists in a motor vehicle wiper, including at least one wiper blade fastened to at least one device for stiffening the wiper blade and to which are fixed at least a mechanical connector adapted to connect the wiper to an arm, the wiper including at least one element in which there is provided at least one conduit adapted to channel a liquid, and a hydraulic connector in communication at least with the conduit and immediately adjacent the mechanical connector, characterized in that the hydraulic connector includes fastening means engaged at least with the stiffening device. Such a wiper can thus be manufactured from standard components on which the hydraulic connector can be installed so that the wiper formed in this way offers a windshield washing liquid spraying function.

Thus the invention provides a technical solution that makes it possible to manufacture a flat wiper with integrated spraying device from a standard flat wiper, i.e. one initially designed to have no integrated spraying device.

The stiffening device may be formed by a metal blade that extends along the wiper. Such a metal blade constrains the wiper to adopt a concave profile when it is not bearing against a substantially plane surface, for example the windshield of the vehicle. The stiffening device thus stiffens the wiper when the latter is in contact with the windshield in order to distribute the contact pressure of the wiper on the windshield uniformly over the length of the wiper.

In accordance with a first feature of the invention, the hydraulic connector includes a connector portion in which there is provided a channel for circulation of the liquid connected to the conduit, the fastening means being formed by at least a first branch originating from said connector portion. In accordance with one option offered by the invention, the first branch originates from a first longitudinal end of said connector portion.

In accordance with a second feature of the invention, the fastening means include a second branch separate from the first branch and originating from said connector portion. This second branch notably originates from a second longitudinal end of said connector portion, opposite the first longitudinal end.

In accordance with one embodiment, the channel provided in said connector portion extends in a longitudinal, for example rectilinear, direction, the first branch and/or the second branch each extending in a concurrent direction different from the longitudinal direction of the channel. In this case, the direction in which the first branch and/or the second branch extends may be orthogonal to the longitudinal direction of the channel.

In accordance with one feature of the invention, said connector portion, the first branch and the second branch delimit an opening in which the all or part of the mechanical connector extend. It is to be understood here that the hydraulic connector surrounds the mechanical connector on three sides thereof.

In accordance with another feature of the invention, the first branch and/or the second branch includes an attachment device on the stiffening device. In this situation, the attachment device may include a first groove in which a first edge surface of the stiffening device is accommodated.

Additionally, the attachment device may include a second groove disposed on the branch opposite the first groove, a second edge surface of the stiffening device being accommodated in this second groove.

It will be noted that the hydraulic connector and the fastening means form a unitary part produced from the same material, said material being chosen to allow elastic deformation of the fastening means on engagement thereof with the stiffening device.

The hydraulic connector and the mechanical connector are separate parts, although installed immediately adjacent each other, i.e. the hydraulic connector extends on either side of the mechanical connector along a longitudinal axis of the wiper.

In accordance with one example of the invention, the hydraulic connector includes a liquid inlet device.

The inlet device includes at least two separate tube members that extend along concurrent axes, for example concurrent at a single point. In another example, the axes of the tube members coincide.

It will be noted that the hydraulic connector may have a symmetrical shape with respect to a plane of symmetry passing through the liquid inlet device, such a plane being perpendicular to a direction in which a channel provided in a portion of the hydraulic connector extends.

In accordance with one embodiment, the hydraulic connector may include protection means covering the liquid inlet device. The protection means may cover the inlet device in at least two directions with areas of the protection means adapted for this purpose.

In this case, the protection means include at least one clip engaged with the liquid inlet device. This clip enables fast fitting of the protection means on the inlet device.

Additionally, the protection means may carry an indicator of wear of the wiper.

A final aspect of the invention is directed to a wiper system comprising a wiper having any one of the features described hereinabove, a liquid feed tube and an arm carrying said wiper.

The element in which the conduit adapted to convey a liquid is provided is preferably an aerodynamic deflector type accessory the effect of which is to increase the force pressing the wiper onto the windshield and thus to enhance wiping.

A first advantage of the invention lies in the possibility of standardizing the manufacture of a maximum of parts usable for a wiper with no spraying device and for a wiper intended to receive a spraying device. In particular, the mechanical connector is identical for these two types of wiper. Moreover, the hydraulic connector being independent of the mechanical connector, it is therefore possible to use the same hydraulic connector for wipers equipped with mechanical connectors having a different structure.

Another advantage lies in the possibility of mounting the hydraulic connector on the wiper on either side of the mechanical connector, at will, so as to use the same wiper structure, in particular the mechanical connector, for arms carrying the wipers that move in the same direction or for arms that move in opposite directions.

Figure 2:
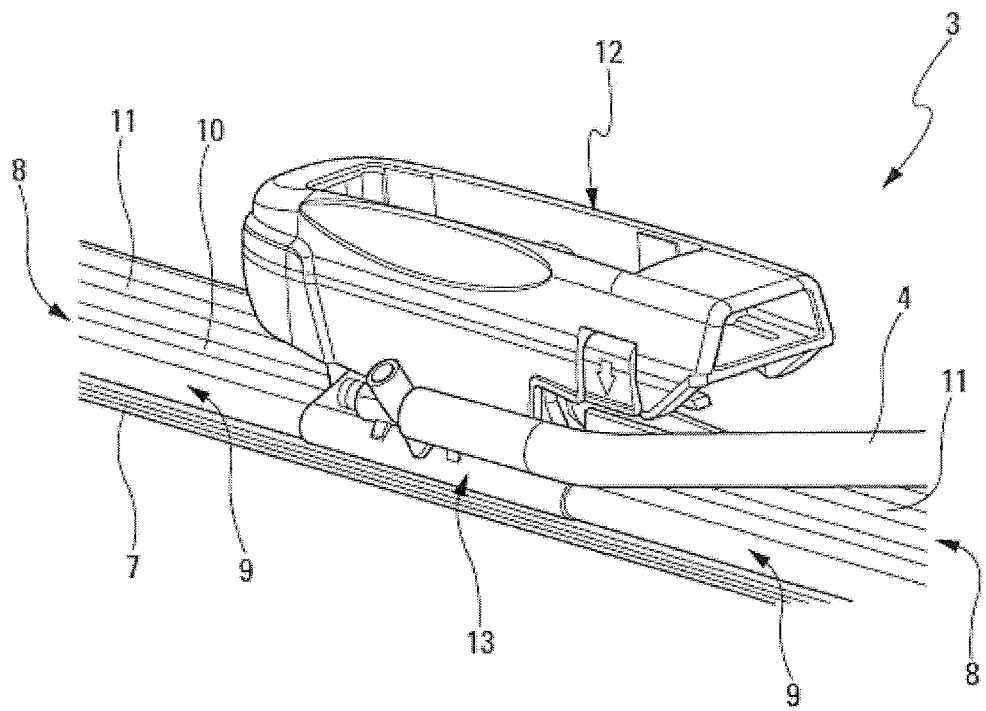
Figure 3:
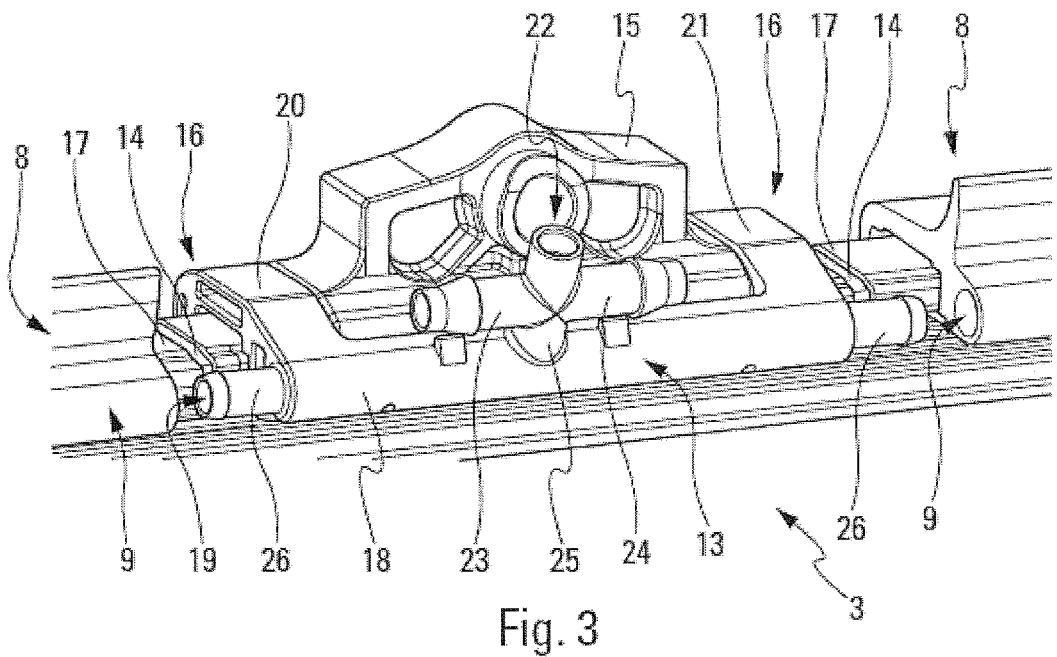
Figure 4:
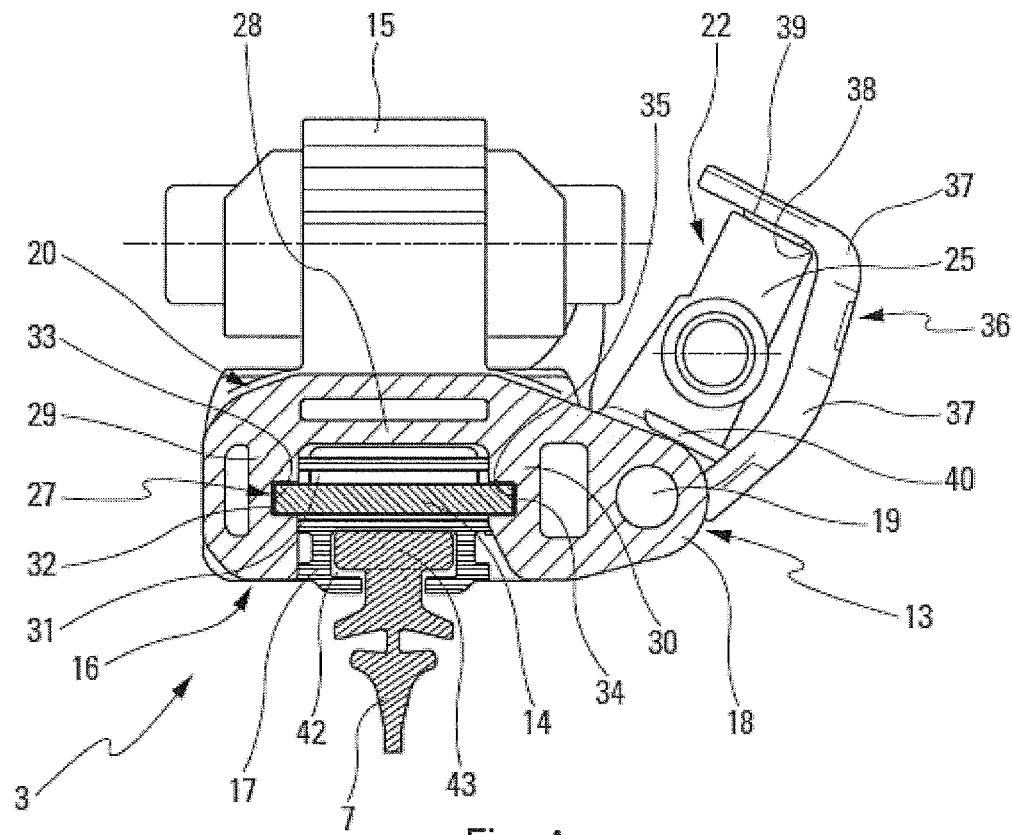
Figure 5:
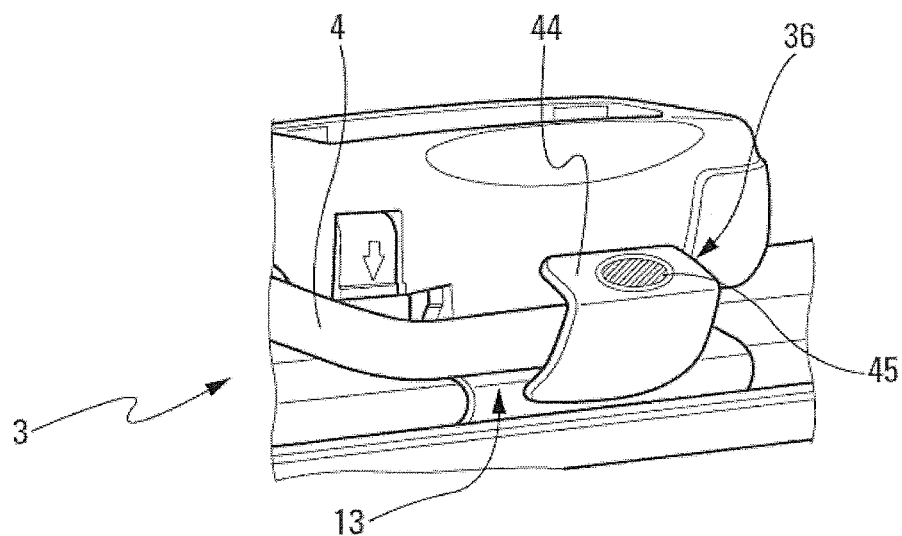
Figure 6:
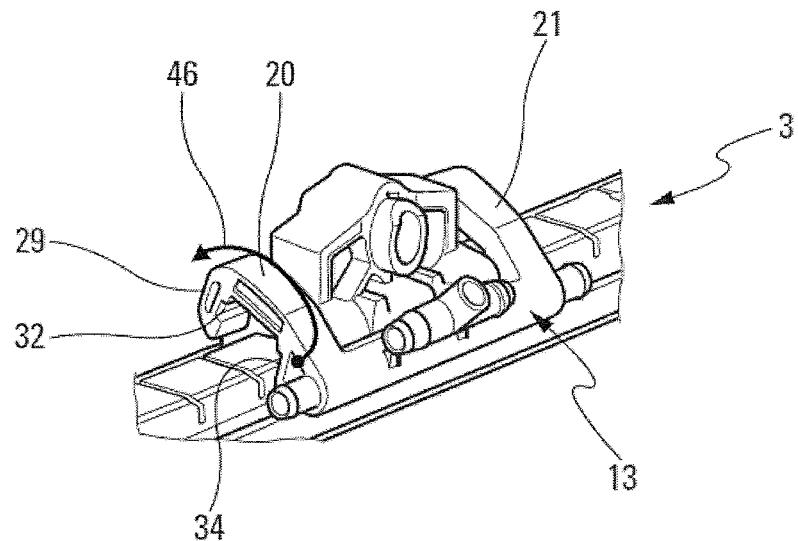

Other features, details and advantages of the invention will emerge more clearly on reading the following description given by way of illustration and with reference to the drawings, in which:

FIG. 1 is a general perspective view of a wiper system for a motor vehicle windshield, FIG. 2 is a partial perspective view of a wiper in accordance with the invention, FIG. 3 is a detailed perspective view of the hydraulic connector installed on the wiper in accordance with the invention, FIG. 4 is a view in cross section of the wiper in accordance with the invention through the fastening means, FIG. 5 is a partial perspective view of a variant of the wiper in accordance with the invention, FIG. 6 is a partial perspective view showing a phase of assembling the hydraulic connector onto the wiper in accordance with the invention.

In the remainder of the description the terms longitudinal and lateral refer to the orientation of the wiper in accordance with the invention. The longitudinal direction corresponds to the main axis of the wiper along which it extends and the lateral orientations correspond to concurrent straight line segments, i.e. straight line segments that cross the longitudinal direction, notably perpendicular to the longitudinal axis of the wiper in its rotation plane. For the longitudinal direction, the terms exterior and interior are to be understood as relative to the point at which the wiper is fixed to the arm, the term interior corresponding to the part in which the arm and one half-wiper extend. Finally, the directions referred to as upper or lower correspond to orientations perpendicular to the rotation plane of the wiper, the term lower encompassing the plane of the windshield.

Referring first to FIG. 1, there is seen a wiper system composed of a wiper-carrier or arm 1 extended at its exterior end by an end piece 2 that is fixed on the interior side by crimping it onto the arm 1. The end piece 2 cooperates with an adapter carrying a wiper 3 via a mechanical connector. The function of the adapter is, for example, to be inserted into the end piece 2 by a movement in translation along a longitudinal axis until it comes into the position of use, in which it is abutted against a cooperating shape imparted to the end piece 2. It is then reversibly fixed thereto, for example by means of a first retractable locking button 5, which is fixed to the end of a first flexible tongue that originates from the adapter and cooperates with an opening made for this purpose in the upper part of the end piece 2.

A liquid feeding tube 4 runs along the arm 1. This tube 4 conveys a windshield washing liquid to an area of connection between the arm 1 and the wiper 3.

At the opposite end of the end piece 2 compared to the arm 1 there is a drive member 6 provided with a hole through which passes a shaft of a drive motor or linkage for rotating the wiper system.

Referring now to FIG. 2, there is seen more precisely the area of connection between the wiper 3 and the arm for driving it in rotation. Such a connection is provided at least in part by an adapter 12 and a mechanical connector, not visible in this figure because accommodated inside the adapter 12.

The wiper 3 includes a wiper blade 7, also called a squeegee, which extends longitudinally along the wiper 3. This is a flexible component of the wiper 3 bearing against the exterior face of the windshield to be wiped.

The wiper 3 further includes at least one element 8 in which there is provided at least one conduit 9 adapted to convey the windshield washing liquid. In the embodiment shown in FIG. 2, the element 8 is an air deflector 10 that caps an upper part of the wiper 3, such an air deflector 10 being notably provided with a deflector blade 11 adapted to employ the dynamic effect of the movement of the vehicle to increase the force pressing the wiper 3 onto the windshield.

It is seen in this figure that the wiper 3 is provided with two separate elements 8 threaded onto the wiper 3 on either side of the area of connection of the wiper 3 to its arm. For example, the two elements 8 have a structure identical to that described above, i.e. delimiting at least one conduit 9 and including at least one deflector blade 11.

The wiper 3 represented in FIG. 2 further includes the adapter 12 the function of which is to provide a mechanical connection between the end of the arm and the mechanical connector. It will be noted that the shape of this adapter 12 varies as a function of the shape of the mechanical connector and the shape of the end of the arm. Such an adapter 12 is consequently a part the structure of which may be modified as a function of the shape of the end of the arm, for example an end that is rectilinear or hook-shaped or includes a pivoted finger and one or more fastening lugs.

The wiper 3 also includes a device for stiffening the wiper blade 7 which will be described in more detail in the forthcoming description with reference to FIGS. 3 and 4.

The wiper 3 further includes a hydraulic connector 13. The latter is referred to as hydraulic in the sense that its function is to convey and distribute washing liquid coming from the liquid feed tube 4 to the conduit or conduits 9. Thus this hydraulic connector 13 is in communication at least with one of the conduits 9. This hydraulic connector 13 is also in communication with the liquid feed tube 4.

In this embodiment, the hydraulic connector 13 is disposed between the two elements 8 threaded onto the wiper 3.

In accordance with the invention, the hydraulic connector 13 is fastened to the wiper 3 by mechanical engagement with the stiffening device.

FIG. 3 shows the disposition of the hydraulic connector 13 relative to this stiffening device 14 and relative to the mechanical connector 15. To facilitate understanding of this arrangement, the two elements 8 have been translated longitudinally so as to decouple the hydraulic connector 13 from the conduits 9 provided on the elements 8. This translation makes it possible to view another component of the structure of the wiper 3, namely a support 17 that surrounds the stiffening device 14 and extends along the wiper 3, except for an area for fixing the mechanical connector 15 and one more areas in which the hydraulic connector 13 is engaged with the stiffening device 14. The support 17 is therefore perforated in line with a first branch 20 of the hydraulic connector 13 and a second branch 21 of the hydraulic connector 13 in order to enable an attachment device 27 of the hydraulic connector 13 to be engaged with the stiffening device 14.

The hydraulic connector 13 is immediately adjacent the mechanical connector 15. By immediately adjacent is meant that the hydraulic connector 13 extends at least in part at the level of the area of connection between the wiper 3 and the arm that carries it. Thus the hydraulic connector 13 is placed beside the mechanical connector 15, for example with no other part disposed between these two components.

The hydraulic connector 13 includes means 16 for fastening the hydraulic connector 13 onto the stiffening device 14. This mechanical fastening is assured by mechanically clamping the fastening means 16 onto the stiffening device 14.

The hydraulic connector 13 is formed by a connector portion 18, for example a rectilinear connector portion, inside which a circulation channel 19 for the washing liquid is provided. When the hydraulic connector 13 is installed on the wiper 3, this connector portion 18 and the channel 19 extend longitudinally and are located laterally relative to the mechanical connector 15. In other words, this connector portion 18 lies to the side of the wiper 3. The channel 19 is in communication with the conduit 9 of each element 8, thus ensuring distribution of the liquid along the wiper 3 with a view to it being sprayed onto the windshield by means dedicated to this purpose.

In accordance with one embodiment, the connector portion 18 is provided with two sleeves 26 each projecting from one longitudinal end of the connector portion 18. Such sleeves 26 lengthen the channel 19 of the connector portion 18 and are accommodated inside the conduit 9 of each element 8.

The fastening means 16 take the form of a first branch 20 that originates on the connector portion 18, for example, advantageously at one longitudinal end of the latter. While connector portion 18 and the channel 19 extend in a longitudinal direction, for example parallel to the longitudinal direction in which the wiper 3 extends, the first branch 20 extends overall in a direction concurrent with and different from this longitudinal direction of the connector portion 18. In one particular example represented in FIG. 3, the direction in which the first branch 20 extends is orthogonal to the longitudinal direction of the connector portion 18. This first branch 20 thus covers an upper part of the stiffening device 14, the first branch 20 notably being immediately adjacent the mechanical connector 15. It will be noted that the hydraulic connector 13 may be fastened to the stiffening device exclusively by the first branch 20.

The first branch 20 is produced from the same material as the connector portion 18, i.e. produced in one piece with said connector portion during the same moulding step.

In accordance with a complementary embodiment, the fastening means 16 may include a second branch 21 separate from the first branch 20. The second branch 21 originates on the connector portion 18, advantageously at a longitudinal end of this connector portion 18 opposite the longitudinal end on which the first branch 20 originates. Whereas the connector portion 18 and the channel 19 extend in the longitudinal direction, for example parallel to the longitudinal direction in which the wiper 3 extends, the second branch 21 extends overall in a direction concurrent with and different from this longitudinal direction of the connector portion 18. In accordance with one particular example represented in FIG. 3, the direction in which the second branch 21 extends is orthogonal to the longitudinal direction of the connector portion 18. Like the first branch 20, this second branch 21 thus covers an upper portion of the stiffening device 14, the first branch 20 and the second branch 21 then being placed on either side of the mechanical connector 15 in the longitudinal direction of the wiper 3, and for example immediately adjacent the latter.

Provided with its two branches, the hydraulic connector 13 is therefore U-shaped when seen in a direction perpendicular to a plane passing through the first branch 20, the connector portion 18 and the second branch 21. In this embodiment, the fastening means 16 then include the first branch 20 and the second branch 21. The U-shape of the hydraulic connector 13 provides an opening in which extends at least part of the mechanical connector 15, and advantageously the whole of the latter, at least in the longitudinal direction of the wiper 3.

The hydraulic connector 13 further includes a windshield washing liquid inlet device 22. This inlet device 22 is a component connected on one side to the channel 19 formed in the connector portion 18 and on the other to the liquid feed tube that runs along the arm of the wiper system.

Such an inlet device 22 includes at least a first tube member 23 and a second tube member 24 through which the liquid can enter the inlet device 22. These two tube members 23 and 24 each delimit a channel extending along concurrent, notably coincident, axes. In the particular example in FIG. 3, these coincident axes are parallel to and separate from the longitudinal direction in which the connector portion 18 extends.

These two tube members 23 and 24 communicate with the channel 19 via a well 25, thus enabling circulation of the washing liquid from one or other of the tube members to the channel 19 of the connector portion 18.

The disposition of the first tube member 23 opposite the second tube member 24 offers the possibility of placing the hydraulic connector 13 on one side or the other of the mechanical connector 15, at the same time as feeding it with liquid via the liquid feed tube the position of which along the arm carrying the wiper is unchanged regardless of the position of the hydraulic connector 13 relative to the mechanical connector 15.

Once the position for the hydraulic connector 13 has been chosen, the tube member that does not receive the liquid feed tube is blocked, for example by means of a plug accommodated in the channel of the tube member concerned, such a plug taking the form of a ball, for example.

The outlet of the well 25 is also plugged by means of a plug of identical shape to that described above for closing the tube member with no liquid feed tube.

In accordance with one embodiment, the inlet device 22 originates from the connector portion 18 at the same distance from the longitudinal ends of that connector portion 18. It is thus clear that the hydraulic connector 13 has a symmetrical shape that enables it to be positioned on one side or the other of the mechanical connector 15, engaged with the stiffening device 14. This symmetry is with respect to a plane perpendicular to the longitudinal direction in which the connector portion 18 extends and passing through the centre of the liquid inlet device 22, notably passing through the centre of the well 25.

FIG. 4 shows the wiper 3 in cross section through the first branch 20. This figure shows the structure of the fastening means 16, including the presence of an attachment device 27 formed on the first branch 20 and/or the second branch for engagement with the stiffening device 14.

The first branch 20 and/or the second branch is U-shaped as seen in a section plane perpendicular to the longitudinal direction of the connector portion 18 and passing through the branch concerned. The first branch 20 and/or the second branch therefore has a central flank 28 bordered by a first lateral flank 29 and a second lateral flank 30, the latter being joined to and in line with the connector portion 18, for example.

The U-shape of these branches 20, 21 delimits a cavity 31 in which at least the stiffening device 14 is accommodated. This cavity 31 therefore includes an internal face at least in part in physical contact with the stiffening device 14.

The first branch 20 and/or the second branch is engaged with this stiffening device 14 by means of at least one first groove 32 provided in the first lateral flank 29 and opening onto the internal face. This first groove 32 is arranged so that a first edge surface 33 of the stiffening device 14 is accommodated in it, thus immobilizing the hydraulic connector 13 relative to the wiper 3.

The attachment device 27 may be complemented by a second groove 34 provided on the second lateral flank 30. Such a second groove 34 has a shape identical to the first groove 32 and is disposed on the second lateral flank 30 opposite the first groove 32. Thus the second groove 34 faces the first groove 32.

This second groove 34 receives a second edge surface 35 of the stiffening device 14 opposite the first edge surface 33. The stiffening device 14 is therefore sandwiched between the two lateral flanks 29 and 30 and held in place by the first groove 32 and/or the second groove 34.

In accordance with one embodiment, the hydraulic connector 13 and the fastening means 16 form a unitary piece produced from the same material, for example manufactured simultaneously during the same operation of moulding the hydraulic connector 13. The hydraulic connector 13 is engaged with the stiffening device 14 by elastic deformation of the branches 20, 21, notably of the central flank 28 and the first lateral flank 29. The branches 20, 21 are then flexed on engaging the hydraulic connector 13 with the stiffening device 14 and then resume their initial shape when the edge surfaces 33 and 35 of this stiffening device 14 are accommodated in the grooves concerned.

The FIG. 4 cross section shows clearly the presence of the channel 19 formed in the connector portion 18 and the liquid inlet device 22. It will be noted that the latter device is inclined to the side so as to avoid any interference with the mechanical connector 15. The direction passing through the centre of the well 25 crosses the longitudinal direction in which the channel 19 extends, the central direction of the well 25 having been rotated clockwise by between 10° and 90° relative to a plane passing through the longitudinal direction in which the channel 19 extends and perpendicular to a plane in which the stiffening device 14 extends.

The hydraulic connector 13 may further include protection means 36 covering the liquid inlet device 22. These protection means 36 have a plurality of functions. A first function is aesthetic, the protection means 36 concealing the shapes of the inlet device 22. A second function is passive protection of pedestrians in the event of collision with the vehicle, since the protection means 36 have rounded shapes 37 that cover the angular edges 38 of the inlet device 36. A third function lies in the possibility of blocking the well 25 by means of a plug 39 in one piece with the protection means 36. Finally, the protection means may implement a fourth function by forming a support for a logo and/or an indicator of wear of the wiper 3, as will be described in detail with reference to FIG. 5.

The protection means 36 are fastened to the liquid inlet device 22, for example by means of a clip 40 formed by two arms between which there is provided a housing of complementary shape to the well 25. Such fastening may be complemented by positioning the plug 39 in the channel delimited by the well 25.

The wiper 3 further includes the support 17 that extends longitudinally along the wiper 3. Inside this support 17 is housed at least the stiffening device 14, the latter taking the form of a flat metal blade, for example. The support 17 is notably a plastic part in which there is provided a central cavity that receives the metal blade, the latter being configured to constrain the wiper 3 to follow a concave profile when it is not pressed against the windshield.

Alternatively, the wiper may comprise two stiffening vertebrae. In this case, the two vertebrae are fastened to the wiper blade of the wiper and the latter then has no support. The wiper blade may be provided with two open slots along the wiper and disposed laterally thereon, these two slots each receiving one of the stiffening vertebrae.

The support 17 further includes a longitudinal housing 42 into which the wiper blade 7 is threaded. The latter includes a heel 43 that extends inside the longitudinal housing 42, this heel 43 being retained between two flanks of the support 17 that surround the heel 43.

FIG. 5 shows the hydraulic connector 13 installed on the wiper 3 in accordance with the invention, only the area of connection with the arm of which can be seen in this figure. Comparing this FIG. 5 with FIG. 2 shows the facility for installing this hydraulic connector 13 on one side (FIG. 2) or the other (FIG. 5) of the same area of connection of the wiper to its arm.

The protection means 36 conceal the liquid inlet device. These protection means 36 include a flat area 44 on which there may be disposed an indicator 45 of wear of the wiper 3, such an indicator being adapted to alert the user of the vehicle to expiry of the service life of the wiper.

FIG. 6 illustrates one phase of assembling the hydraulic connector 13 to the wiper 3. In this figure, the second groove 34 is on the point of entering into engagement with the second edge surface of the stiffening device. An arrow 46 shows tilting of the hydraulic connector 13 about the point of contact between the second groove 34 and the second edge surface of the stiffening device. This tilting continues until a free end of the first lateral flank 29 is brought into contact with the stiffening device. A force exerted as a result of this tilting movement then causes elastic deformation of the first branch 20 and/or the second branch 21 so as to enable the first edge surface of the stiffening device to enter the first groove 32. This is how the hydraulic connector is engaged with the stiffening device.

The invention claimed is:

1. A motor vehicle wiper, comprising:
    at least one wiper blade fastened to at least one device for stiffening the wiper blade, which comprises a metal blade extending along the wiper,
    at least one mechanical connector adapted to connect the wiper to an arm, fixed onto the at least one wiper blade and the stiffening device;
    a hydraulic connector; and
    at least two elements forming an air deflector, each of the at least two elements comprising at least one conduit formed therethrough and adapted to channel a liquid, and each of the two elements threaded onto the wiper blade and disposed adjacent to the hydraulic connector,
    wherein the hydraulic connector is in communication with the conduits and immediately adjacent the mechanical connector,
    wherein the hydraulic connector comprises:
        a connector portion in which there is provided a channel for circulation of the liquid connected to the conduit,
        fastening means engaged at least with the stiffening device, and
        two flanks, a first branch, a second branch, and an opening formed therebetween,
        wherein the fastening means being formed by at least the first branch originating from the connector portion,
        wherein the second branch is separate from the first branch and originates from the connector portion, and
        wherein the connector portion, the first branch and the second branch delimits the opening in which the all or part of the mechanical connector extends, and
        wherein the mechanical connector extends in the opening.

2. The wiper according to claim 1, wherein the channel provided in the connector portion extends in a longitudinal direction, the first branch and/or the second branch extending in a concurrent direction different from the longitudinal direction of the channel.

3. The wiper according to claim 1, wherein the first branch and/or the second branch includes an attachment device on the stiffening device.

4. The wiper according to claim 3, wherein the attachment device includes a first groove in which a first edge surface of the stiffening device is accommodated.

5. The wiper according to claim 4, wherein the attachment device includes a second groove disposed on the one of the first branch and the second branch which is opposite the first groove, a second edge surface of the stiffening device being accommodated in this second groove.

6. The wiper according to claim 1, wherein the hydraulic connector and the fastening means form a unitary part produced from the same material, said material being chosen to allow elastic deformation of the fastening means on engagement thereof with the stiffening device.

7. The motor vehicle wiper according to claim 1, wherein the inlet device includes at least two separate tube members that extend along concurrent axes.

8. A wiper system comprising:
    the wiper according to claim 1;
    a liquid feed tube; and
    the arm carrying said wiper.

9. A motor vehicle wiper, comprising:
    at least one wiper blade fastened to at least one device for stiffening the wiper blade, which comprises a metal blade extending along the wiper,
    at least one mechanical connector adapted to connect the wiper to an arm, fixed onto the at least one wiper blade and the stiffening device;
    a hydraulic connector; and
    at least two elements forming an air deflector, each of the at least two elements comprising at least one conduit formed therethrough and adapted to channel a liquid, and each of the two elements threaded onto the wiper blade and disposed adjacent to the hydraulic connector,
    wherein the hydraulic connector is in communication with the conduits and immediately adjacent the mechanical connector,
    wherein the hydraulic connector comprises:
        protection means covering a liquid inlet device,
        fastening means engaged at least with the stiffening device, and
        two flanks, a first branch, a second branch, and an opening formed therebetween,
    wherein the mechanical connector extends in the opening.

10. A motor vehicle wiper, comprising:
    at least one wiper blade fastened to at least one device for stiffening the wiper blade, which comprises a metal blade extending along the wiper,
    at least one mechanical connector adapted to connect the wiper to an arm, fixed onto the at least one wiper blade and the stiffening device; and
    at least two elements, each of the at least two elements comprising at least one conduit formed therethrough and adapted to channel a liquid, and each of the two elements disposed adjacent to a hydraulic connector and to the mechanical connector,
    wherein the hydraulic connector is in communication at least with the conduits and immediately adjacent the mechanical connector,
    the hydraulic connector comprising:
        a connector portion in which there is provided a channel for circulation of the liquid connected to the conduit,
        fastening means engaged at least with the stiffening device, and
        a liquid inlet device disposed at an acute angle to a vertical plane and a horizontal plane, the vertical plane and the horizontal plane bisecting the wiper blade in an axial direction, and the liquid inlet device extending and opening upward in a direction opposed to the wiper blade,
    wherein the liquid inlet device feeds the channel for circulation of the liquid of the connector portion.

11. A motor vehicle wiper, comprising:
    at least one wiper blade fastened to at least one device for stiffening the wiper blade, wherein at least one mechanical connector adapted to connect the wiper to an arm is fixed onto the at least one wiper blade and device, and wherein the stiffening device comprises a metal blade that extends along the wiper; and at least one element comprising at least one conduit adapted to channel a liquid, and a hydraulic connector in communication at least with the conduit and immediately adjacent the mechanical connector, the hydraulic connector comprising:

a liquid inlet device, wherein the hydraulic connector has a symmetrical shape with respect to a plane of symmetry passing through the liquid inlet device.

* * * * *